March 9, 1954 W. W. SMITH 2,671,886
VARIABLE OUTPUT TRANSFORMER FOR CONVERTER APPARATUS
Filed Feb. 15, 1949 2 Sheets-Sheet 1

WALTER W. SMITH
INVENTOR

BY
ATTORNEY

March 9, 1954  W. W. SMITH  2,671,886
VARIABLE OUTPUT TRANSFORMER FOR CONVERTER APPARATUS
Filed Feb. 15, 1949  2 Sheets-Sheet 2

WALTER W. SMITH
*INVENTOR.*

BY

*ATTORNEY*

Patented Mar. 9, 1954

2,671,886

UNITED STATES PATENT OFFICE 2,671,886

VARIABLE OUTPUT TRANSFORMER FOR CONVERTER APPARATUS

Walter W. Smith, Eureka, Calif.

Application February 15, 1949, Serial No. 76,615

10 Claims. (Cl. 336—120)

This invention relates to a device for providing a source of current variable as to value and/or reversible as to polarity, and is more particularly concerned with a device for providing unidirection current variable as to value and reversible as to polarity.

This application is a continuation in part as to my prior copending application Ser. No. 603,962 filed July 9, 1945; and my application Ser. No. 193,048, filed October 31, 1950, both of which applications include in the disclosure a device as herein described and claimed.

As pointed out in the applications referred to it is desirable to provide a reliable source of direct current for the energizing of the field windings of dynamos, such as direct current generators and motor, which source can be regulated so as to vary the average value of current delivered, and/or which provides for reversing the current through the field winding. It is one of the objects of this invention so to provide.

It is another object of this invention to provide a current source which provides for varying the value of current continuously between limits, which provides for interruption of the current at the lower values of current only, and which provides for establishing the flow of current under conditions requiring a minimum flow of current.

It is a further object of this invention to provide a source of variable direct current voltage which translates energy from alternating current to direct current and which provides for choice of direct current polarity.

It is a further object of this invention to provide an alternating current translating device such that the instantaneous polarity of output terminals thereof may be reversed with respect to corresponding instantaneous polarity of the input terminals.

An additional object of this invention is to provide a source of reversible direct current such that in reversing the direction of current flow, the changing circuit connections do not involve interruption of current flow through such connections.

Further objects and advantages of my invention will be evident or will be pointed out in the following specification wherein reference is made to the accompanying drawing, and in which.

Figure 1:
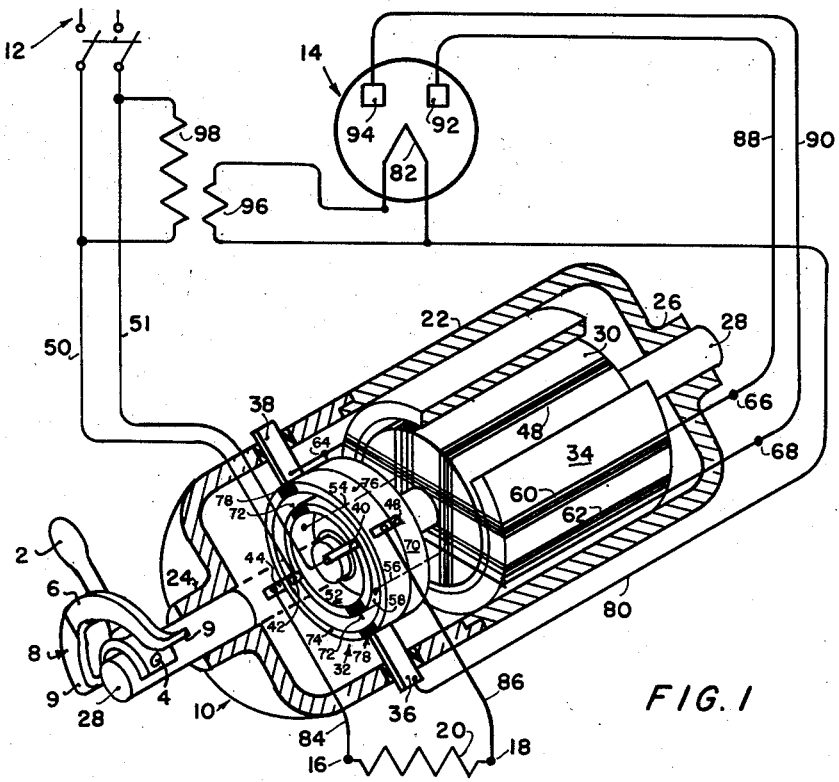
Fig. 1 is a schematic diagram showing a preferred embodiment of the invention.
Figure 2:
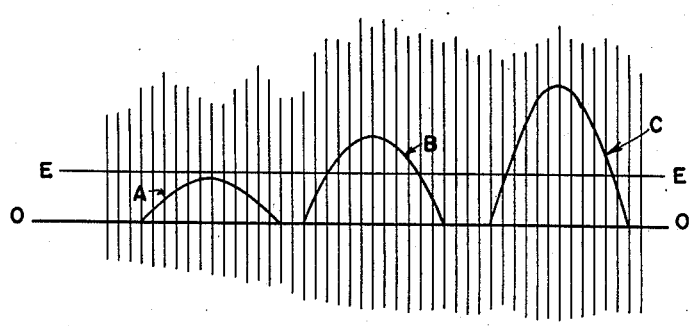
Fig. 2 is an analytic diagram illustrating some of the functions of the apparatus.
Figure 2A:
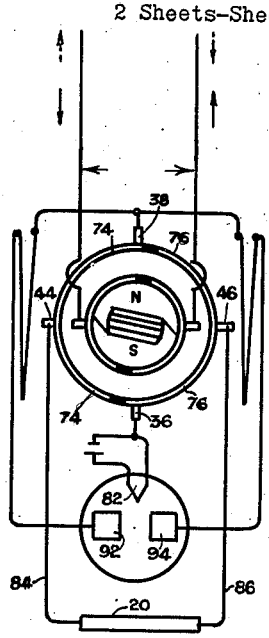
Figure 2B:
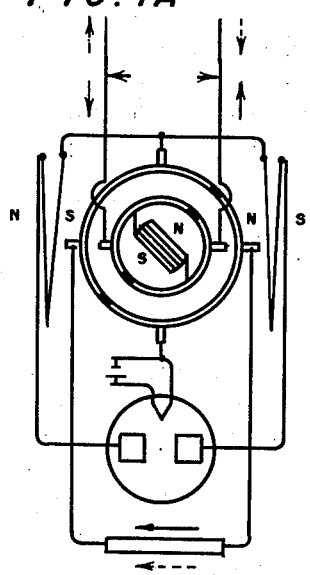
Figure 2C:
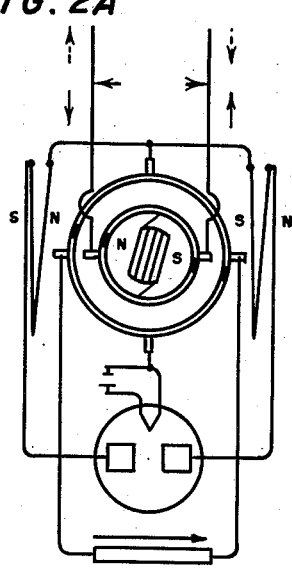

Figs. 2A, 2B, and 2C illustrate the operation of the apparatus of Fig. 1.

The apparatus comprises a controller 10, a source of alternating power 12, and a rectifier 14. The controller 10 delivers unidirectional current of either polarity and of varying value to output terminals 16 and 18, across which a load 20, such as the field winding of a reversible dynamo, can be permanently connected as shown.

The controller 10 comprises a housing 22 providing journals 24 and 26 for a single shaft 28 rotatable therein. The shaft 28 carries for rotation therewith the rotor 30 of a variable induction transformer and an assembly of slip-ring segments 32 as will be described in greater detail. The housing 22 has fixed therein a stator 34 of the variable induction transformer and a series of brushes 36, 38, 40, 42, 44, and 46 for coaction with the segmental slip-rings.

The rotor 30 provides a primary winding 48 constructed and arranged to have its magnetic axis perpendicular to the axis of shaft 28 and rotatable therewith. Alternating current from source 12 is conducted to and from winding 48 as follows: from source 12 via conductor 50, brush 42, slip-ring segment 52, conductor 54, winding 48, conductor 56, slip-ring segment 58, brush 40, and conductor 51 back to source 12.

The stator 34 provides a two part secondary winding having sections 60 and 62, having the same magnetic axis fixed at right angles to shaft 28 for coupling with winding 48, joined at center tap 64 and there connected to brush 38. The other ends of the secondary windings are brought to terminals 66 and 68. The voltage appearing between terminals 66 and 68 is variable and approximately double that of either of sections 60 and 62.

The assembly of slip-ring segments 32 comprises a disc 70 of insulation secured to shaft 28 and carrying thereon the two slip-ring segments 52 and 58 which are fixed in ring arrangement and separated electrically at their ends as shown at 72. The brushes 40 and 42 are so located as shown that the segments 52 and 58 always remain in contact with but one brush so long as the shaft 28 rotates within defined limits, thus preventing the interruption of the primary current at the slip-ring and brush interfaces.

The assembly 32 further provides slip-ring segments 74 and 76 also arranged in arcuate extension of each other and separated by insulation as at 78—78. Brushes 44 and 46 are arranged to contact segments 74 and 76 at about their midpoints as shown so that they remain in contact with but one of these segments for all permitted positions of the shaft 28.

Figure 1A:
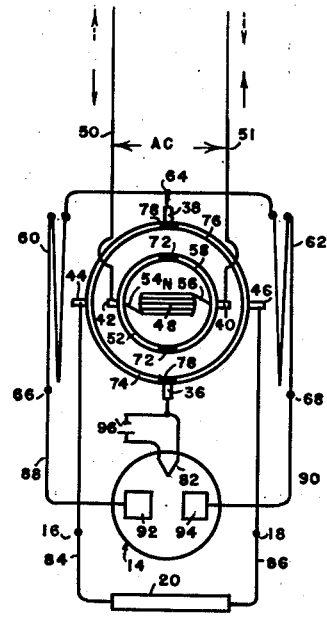
Fig. 1A illustrates the apparatus of Fig. 1 in neutral position.

In the relative positions of the controller parts shown in Figs. 1 and 1A, no voltage, or an inappreciable voltage, is induced in the secondary winding sections 60 and 62, because the magnetic axis of the winding 48 is at, or nearly at, right angles to that of sections 60 and 62. Under these conditions the brushes 36 and 38 are in registry with the insulating barriers 78 between slip-ring segments 74 and 76.

Brush 36 is connected by conductor 80 with the cathode 82 of rectifier valve 14. The brushes 44 and 46 are connected via conductors 84 and 86 to the output terminals 16 and 18 of the controller. The two terminals 66 and 68 of the secondary windings 60 and 62 are connected by conductors 88 and 90 with anodes 92 and 94 of rectifier 14.

The valve 14 is preferably of the electronic type in which the cathode is either directly or indirectly heated from a source of electricity such as the secondary winding 96 of a transformer the primary winding of which is connected to the conductors 50 and 51.

Such valves pass current only when their anodes are electro-positive to their cathodes, and then only when there is a substantial voltage between the anode and cathode sufficient to cause conduction in the space between anode and cathode.

Assuming that shaft 28 is rotated clockwise slightly so as to make only initial contacts of brush 36 with segment 76 and brush 38 with segment 74 as illustrated in Fig. 2A, it will be seen that the voltage of windings 60 and 62 will be only slightly more than the minimum or zero value. These voltages are, however, alternately impressed upon the tube 14 and load 20 in series as follows: considering the windings 60 and 62 as the voltage sources, the potential of terminal 64 is extended to cathode 82 via brush 38, segment 74, brush 44, conductor 84, load 20, conductor 86, brush 46, segment 76, brush 36, and conductor 80; the potentials of terminals 66 and 68 are extended to anodes 92 and 94 by the conductors 88 and 90.

Referring now to Fig. 2, the horizontal line O—O is regarded as a time axis and the vertical lines measure off on the line O—O equal intervals of time. Distance measured upwardly from line O—O along the vertical lines is proportional to voltage. The line E—E represents that positive value of voltage, which when applied to the anode 92 or anode 94 and cathode 82, will cause current to flow. The curves A, B, and C represent half waves of positive voltage resulting in coils 60 and 62, corresponding to various positions of shaft 28 illustrated in Figs. 2A, 2B and 2C. The curve A represents the successive values of voltage appearing across 92 and 82 or 94 and 82, at an instant while contact is being made between brushes 36 and 38 and their respective slip-ring segments. Since curve A at none of its values equals the value of voltage represented by line E—E, no breakdown of the resistance of the tube 14 occurs and no current flows.

If now shaft 28 be rotated until a voltage half-cycle such as that of curve B results, it is observed that the value of voltage exceeds that defined by line E—E and current flows. It will be clear, however, that current flows in but one direction through the tube and circuit, which direction is such that cathode 82 may be regarded as of positive polarity, and anode 92 as of negative polarity, the valve itself being regarded as a generator. Brush 36 is therefore always positive, and brush 38 is always negative when current flows. This is true irrespective of which direction shaft 28 is rotated from the neutral position as shown.

If shaft 28 is rotated clockwise, as viewed from the left end thereof, segment 76 and hence brush 46 and output terminal 18 become positive; and segment 74 with brush 44 and output terminal 16 at the same time become negative; and therefore, any current flow through load 20 is from terminal 18 to terminal 16. On the other hand, if shaft 28 be rotated anti-clockwise from the position shown, segment 74 becomes positive and segment 76 negative. Accordingly flow is from terminal 16 to 18 in load 20.

By referring to Fig. 2 it will be seen that the voltage wave C reaches the value E earlier in the half-cycle than does the voltage wave B. The portion of the cycle during which load 20 carries current is thus variable by turning shaft 28.

Two different effects result depending upon whether valve 14 is of the high vacuum type, or of the gas-filled type. If valve 14 is of the high vacuum type, the current flow continues only during the portion of the half-cycle during which the wave B or C exceeds the value E. However, if the valve 14 be of the gas-filled type, current flow continues from the time the voltage reaches the value E until the end of the half-cycle. Therefore, by using a high vacuum valve 14, the time period of conduction can be shortened to as small a time interval as one pleases by reducing the amplitude of the half-waves C. By using a gas-filled tube, however, current flow is controllable to extend from 50% of the half-wave duration upwardly to something less than 100%.

The shaft 28 is provided with a handle 2 for rotating it. Handle 2 is pivoted to shaft 28 by a pin 4 passing through the shaft at right angles thereto, and is free to drop into a notch 6 provided in bracket 8 which is suitably secured to housing 22. Bracket 8 provides stops 9 to engage handle 2 and prevent rotation more than 85 degrees each way from the neutral position.

It will be observed that, if the rectifier 14 be omitted, and either of the conductors 88 and 90 be connected to conductor 80 directly, then only alternating current flows in the secondary circuit including load 20. Nevertheless, the device is useful as a source of variable alternating current, and the secondary circuit still is interrupted only when the voltage of the secondary circuit is at or near zero value. When this modification is made in the circuit, it will be clear upon reflection, that the relative instantaneous polarities of the brushes 44 and 42 may be reversed, a corresponding inverse reversal of the relative instantaneous polarities of brushes 40 and 48 taking place at the same time. Thus, a reversal in the phase relationship between currents flowing in the primary and secondary circuits of the transformers may be effected by passing through the neutral position.

In the drawing Figs. 1A, 2A, 2B, and 2C, arrows in solid black and dotted lines have been shown. Solid arrows indicate simultaneous or derived currents of one half cycle of alternating current, and dotted arrows indicate simultaneous or derived currents of the other half cycle of full cycles of alternating current.

The transformer is adjustable for alternating current polarity reversal simultaneously with reversal of the position of rotor 48. In Fig. 1 the polarity of coil 48 is shown as produced by the positive half of an A. C. wave indicated by the solid arrows. In Fig. 2B a corresponding half of the primary current wave produces simultaneously the polarities indicated in the secondary windings. In Fig. 2C the same half wave of primary current produces the polarities indicated to be opposite of those shown in Fig. 2B.

I claim:

1. In combination, a transformer having a stator provided with a winding and a rotor provided with a winding, a shaft connected to said rotor to rotate said rotor winding and to vary the mutual induction between the stator and rotor windings through and from a zero value, pairs of slip-ring conductor segments mounted on said rotor, pairs of brushes individual to said segments mounted on the stator, one pair of segments being permanently connected with the rotor winding and a pair of brushes cooperating with said pair of segments so as to be in electrical contact therewith at all values of induction including zero values, a second pair of slip-ring conductor segments mounted on said rotor in arcuate extension of and insulated from each other, a second pair of brushes contacting said pair of segments at all values of induction including zero value, a third pair of brushes arranged to contact the second pair of segments only when the induction is greater than zero, said third pair of brushes being connected in circuit with the stator winding.

2. In combination, a transformer having a stator provided with a winding and a rotor provided with a winding, a shaft connected to said rotor to rotate said rotor winding and to vary the mutual induction between the stator and rotor windings through and from a minimum value, pairs of slip-ring conductor segments mounted on said rotor, pairs of brushes individual to said segments mounted on the stator, one pair of segments being permanently connected with the rotor winding, a pair of brushes engaging the respective segments between the ends with at values of induction including the minimum thereof so as to be in electrical contact therewith at values of induction including the minimum value, a second pair of slip-ring conductor segments mounted on said rotor in arcuate extension of and insulated from each other, a second pair of brushes engaging the respective segments of the second pair of segments between the ends thereof at values of induction including said minimum value, a third pair of brushes arranged to contact the second pair of segments when the induction is greater than zero and to disengage said segments when the mutual induction is a minimum, said third pair of brushes being connected in circuit with the stator winding.

3. In combination, a transformer having a stator provided with a winding and a rotor provided with a winding, a shaft connected to said rotor to rotate said rotor winding and to vary the mutual induction between the stator and rotor windings through and from a zero value, pairs of arcuate conductors mounted on said rotor, pairs of brushes individual to said arcuate conductors mounted on the stator, one pair of said arcuate conductors being permanently connected with the rotor winding and a pair of brushes cooperating with said pair of arcuate conductors so as to be in electrical contact therewith at values of induction including zero values, a second pair of arcuate conductors mounted on said rotor, a second pair of brushes for contacting said second pair of arcuate conductors at values of induction including the zero value, a third pair of the brushes being arranged to contact the second pair of arcuate conductors when the induction is greater than zero and means for causing the third pair of brushes to break contact with the second pair of arcuate conductors when the induction is zero; said third pair of arcuate conductors being connected in circuit with the stator winding.

4. In combination, a transformer having a stator provided with a winding and a rotor provided with a winding, a shaft connected to said rotor to rotate said rotor and said windings being arranged to vary the mutual induction between the stator and rotor windings incident to such rotation through and from a minimum value, pairs of arcuate conductors mounted on said rotor, pairs of brushes individual to said arcuate conductors mounted on the stator, means including terminals on said stator for connecting the rotor winding to a source of alternating current so as to be in circuit therewith at values of mutual induction including the minimum values, a pair of arcuate conductors mounted on said rotor, a pair of brushes for contacting said pair of arcuate conductors at values of induction including the minimum value, a second pair of brushes arranged to contact the second pair of arcuate conductors when the induction is greater than the minimum and means for causing the second pair of brushes to break contact with the second pair of arcuate conductors when the induction is a minimum; said second pair of arcuate conductors being connected in circuit with the stator winding.

5. In combination, a transformer having a stator provided with a winding and a rotor provided with a winding, a shaft connected with said rotor to rotate said rotor winding and to vary the mutual induction between the stator and rotor windings through and from a minimum value, pairs of slip-ring conductor segments mounted on said rotor, pairs of brushes individual to said segments mounted on the stator, one pair of segments being permanently connected with the rotor winding and a pair of brushes engaging the respective segments between the ends thereof so as to be in electrical contact therewith at values of induction including the minimum value, a second pair of slip-ring conductor segments mounted on said rotor in arcuate extension of and insulated from each other, a second pair of brushes engaging the respective segments of the second pair of segments between the ends thereof at values of induction including said minimum value, a third pair of brushes arranged to contact the second pair of segments when the induction is greater than zero and to disengage said segments when the mutual induction is a minimum, one of said third pair of brushes being connected to the stator winding between the ends thereof and means including said second pair of brushes and said second pair of segments for forming a connection of the ends of the stator winding with the other one of said third pair of brushes.

6. A transformer having a pair of input terminals for the connection thereto of a source of alternating current and having three output terminals; said transformer including a primary winding with end turns connected to the input terminals and including a secondary winding in two sections having a common magnetic axis, each section of the secondary winding having one end turn connected to one of the output terminals, and the other end turn connected to a respective one of the other two output terminals; means associating the primary winding with the secondary winding sections in such a manner that current changes in the primary winding induce simultaneous voltages of opposite polarity at the terminals of the secondary winding sections; means for varying the mutual induction between the primary winding and secondary winding sections simultaneously and in like degrees in each secondary winding; and means for altering the phase relationship between the voltages induced in said secondary sections through one half cycle of alternating current with respect to an alternating current applied to the input terminals.

7. A transformer having a pair of input terminals for the connection thereto of a source of alternating current and having three output terminals; said transformer including a primary winding with end turns connected to the input terminals and including a secondary winding in two sections having a common magnetic axis, each section of the secondary winding having one end turn connected to one of the output terminals, and the other end turn connected to a respective one of the other two output terminals; means associating the primary winding with the secondary winding sections in such a manner that current changes in the primary winding induce simultaneous voltages of opposite polarity at the terminals of the secondary winding sections; means for varying the mutual induction between the primary winding and secondary winding sections simultaneously and in like degrees in each secondary winding; means for altering the phase relationship between the voltages induced in said secondary sections thru one-half cycle of alternating current with respect to an alternating current applied to the input terminals, and means for maintaining the same relative polarity of the output terminals as before altering the phase relation.

8. A variable induction transformer apparatus comprising relatively rotatable primary and secondary windings having respectively input and output terminals, means for rotating one winding with respect to the other so as to alter the relative polarities of the windings, and means for altering the connections of one of the windings to its terminals simultaneously with polarity alteration.

9. In a variable induction transformer apparatus, a stator structure including windings, a rotor structure including windings, means including input terminals for conducting current to one of the windings, output terminals for the other of the windings, and circuit control means controlled in concert with rotor rotation for adjusting the polarity of the output terminals with respect to the polarity of the input terminals.

10. A transformer having in combination: a primary winding, a secondary winding, means for varying the inductive coupling between the primary and the secondary windings through a zero value of coupling whereby the phase relation of primary and secondary terminal voltages is reversed, output terminals for said transformer, and switching means for joining the windings to the output terminals to cause the simultaneous reversal of connections of the transformer windings to the output terminals.

WALTER W. SMITH.

References Cited in the file of this patent
UNITED STATES PATENTS

| Number | Name | Date |
|---|---|---|
| 735,103 | Hull | Aug. 4, 1903 |
| 751,016 | Rogers | Feb. 2, 1904 |
| 1,771,551 | Strohschneider | July 29, 1930 |
| 2,420,449 | Somes | May 13, 1947 |
| 2,466,690 | Curry | Apr. 12, 1949 |